United States Patent
Amacker

(10) Patent No.: US 12,434,188 B1
(45) Date of Patent: Oct. 7, 2025

(54) SYSTEM AND METHOD FOR INCREASING SURFACE WATER BODY pH TO ENHANCE CARBON DIOXIDE CAPTURE AND HOLDING CAPACITY

(71) Applicant: Andrew Russell Amacker, New Orleans, LA (US)

(72) Inventor: Andrew Russell Amacker, New Orleans, LA (US)

( * ) Notice: Subject to any disclaimer, the term of this patent is extended or adjusted under 35 U.S.C. 154(b) by 325 days.

(21) Appl. No.: 18/356,442

(22) Filed: Jul. 21, 2023

Related U.S. Application Data

(60) Provisional application No. 63/373,925, filed on Aug. 30, 2022.

(51) Int. Cl.
| | | |
|---|---|---|
| *B01D 53/02* | (2006.01) | |
| *B01D 53/62* | (2006.01) | |
| *B01D 53/78* | (2006.01) | |

(52) U.S. Cl.
CPC ............ *B01D 53/78* (2013.01); *B01D 53/62* (2013.01); *B01D 2251/404* (2013.01); *B01D 2252/1035* (2013.01); *B01D 2257/504* (2013.01)

(58) Field of Classification Search
CPC .. B01D 53/78; B01D 53/62; B01D 2251/404; B01D 2252/1035; B01D 2257/504
See application file for complete search history.

(56) References Cited

U.S. PATENT DOCUMENTS

| | | |
|---|---|---|
| 3,969,482 A | 7/1976 | Teller |
| 3,981,966 A * | 9/1976 | Baucom .............. C22B 15/0093 |
| | | 423/104 |
| 8,246,731 B2 | 8/2012 | Lackner et al. |
| 9,914,644 B1 | 3/2018 | Eisaman |
| 10,197,747 B2 | 2/2019 | Constantz et al. |
| 11,097,221 B2 | 8/2021 | Lu et al. |
| 11,629,067 B1 | 4/2023 | Pelman et al. |
| 2014/0014299 A1* | 1/2014 | Ebata .................. F28D 20/003 |
| | | 165/104.12 |
| 2020/0370001 A1 | 11/2020 | Constantz et al. |
| 2023/0124711 A1 | 4/2023 | Chen et al. |

FOREIGN PATENT DOCUMENTS

WO    WO2015134408    9/2015

* cited by examiner

*Primary Examiner* — Christopher P Jones
(74) *Attorney, Agent, or Firm* — Garvey, Smith & Nehrbass, Patent Attorneys, L.L.C.; Seth M. Nehrbass; Fabian M. Nehrbass

(57) ABSTRACT

A system and method for enhancing carbon dioxide capture and holding capacity in surface water bodies by increasing their pH. The system utilizes calcium sulfate dihydrate or other calcium sulfate predominate sources to achieve the desired pH elevation. The process comprises a dehydration step to convert a feedstock of calcium sulfate dihydrate into calcium sulfate anhydrate, a cooking step to decompose calcium sulfate anhydrate into a solid calcium oxide bearing mixture and a vapor mixture of sulfur trioxide, sulfur dioxide, and oxygen, a cooling step to lower the temperature of the calcium oxide, and a capture media creation step to dissolve the cooled calcium oxide in water. The resulting buffered solution may be blended with additional water in the proportioning and discharge steps and discharged into a surface water body, increasing the pH of the surface water allowing it to capture and store additional carbon dioxide from the air.

11 Claims, 8 Drawing Sheets

SYSTEM AND METHOD FOR INCREASING SURFACE WATER BODY pH TO ENHANCE CARBON DIOXIDE CAPTURE AND HOLDING CAPACITY

CROSS-REFERENCE TO RELATED APPLICATIONS

This application claims priority to U.S. Provisional Patent Application No. 63/373,925, filed Aug. 30, 2022. The aforementioned application is incorporated herein by reference as if copied herein in extenso.

FIELD OF THE INVENTION

The present invention relates to the field of carbon dioxide capture, and more specifically, to a system and method for increasing the pH of surface water bodies to enhance carbon dioxide capture and holding capacity.

GENERAL BACKGROUND

In various aspects, the present disclosure provides methods for capturing and sequestering carbon dioxide as a pollutant present in ambient air.

The statements in this section merely provide background information related to the present disclosure and may not constitute prior art.

The present invention relates to a system and method for increasing the pH of surface water bodies to enhance carbon dioxide capture and holding capacity. The following sections describe various related art in the fields of pH enhancement, direct air capture, and carbon dioxide sequestration.

I. Methods of pH Enhancement
A. Alkaline Minerals Addition

One approach to increase the pH of surface water bodies involves the addition of alkaline minerals such as limestone (calcium carbonate) or olivine (magnesium silicate) to water. These minerals dissolve in the water, increasing its alkalinity and enhancing its ability to absorb carbon dioxide. However, this approach can be resource-intensive, and the dissolution rates of these minerals can be slow, limiting the effectiveness of this method.

B. Electrochemical Systems

Some electrochemical systems have been proposed to increase the pH of surface water bodies. In these systems, an electrical current is passed through the water, causing chemical reactions that increase the pH and enhance carbon dioxide absorption. However, these systems can be energy-intensive and may produce unwanted byproducts, such as chlorine gas, which could have negative environmental impacts.

II. Direct Air Capture Methods

The following is a survey of techniques for direct air capture currently in use at commercial scale or with current plans for commercial scale implementation.

A. Forestry

Direct air capture by forestry is achieved by either conserving existing forest (avoided conservation), improved forest management, or afforestation/reforestation. Avoided conservation generates carbon offsets by taking credit for the future carbon capture of forest that would have been destroyed if not for a present conservation effort. Improved forest management uses techniques in commercial forestry/timber which improve the capture ability of forests. Afforestation/reforestation involves creating new forest on lands which are not currently forested. Forestry carbon credits are some of the least expensive credits to generate, at $4-$25 per metric ton of carbon dioxide captured, depending on type and scale.

Forestry carbon credits are controversial because it is difficult to guarantee that the forest's capture ability will not fall below projections over extended timelines, that preservation efforts are not counteracted by increased clearing elsewhere, or, in the case of avoided conservation, that the forest generating the offset was actually in danger of clearance.

Forestry capture methods are also extremely land intensive. Currently, forests in the United States absorb on average about 1.13 metric tons of carbon dioxide per acre per year. In order to capture 5 million metric tons of carbon dioxide per year, 4.4 million acres of new forest would need to be created. As a comparison, the state of New Jersey is 5.5 million acres. The land intensive nature of forestry capture credits severely limits the amount of carbon credits that can be generated using this method. Additionally, carbon capture credits generated in this way are explicitly barred from receipt of Code 45Q tax credits, ensuring the sale price of these credits remains depressed relative to other methods.

B. Liquid Amine

This type of system is proposed by Black & Veatch. The liquid amine process puts an amine chemical, which has a high affinity for $CO_2$, in contact with an air stream inside of a large contactor vessel filled with plates, trays, or packing to increase the exposure of the air stream to the amine. The amine after capture, termed rich amine, is then heated with steam in a stripper column to release the $CO_2$. The amine after stripping, termed lean amine, is cooled, and then pumped back through the contactor vessel to capture more $CO_2$. The $CO_2$ released in the stripper column is then sequestered.

Amine systems and principles are well understood due to the extensive use of the technology in upstream oil and gas to remove $CO_2$ and $H_2S$ from natural gas streams. However, the systems are capital intensive and need amine as a capture media. Amine is both toxic and expensive, with costs of around $1700 per ton in 2012. If liquid amine systems become the predominate air carbon capture technology, it is reasonable to assume that this cost for the regeneration media would greatly increase.

C. Carbonate Solution

The carbonate solution system is used by Carbon Engineering, and it consists of an air contactor cycle and a regeneration cycle. In the air contactor cycle, a potassium hydroxide solution is put in contact with an air stream inside of a large contactor vessel filled with packing to increase the exposure air to the solution. This solution will react with carbon dioxide in the air to create potassium carbonate and water. The potassium carbonate is then sent into a pellet reactor with slaked lime pellets where they are reacted to form potassium hydroxide and limestone. The potassium hydroxide is then sent back to the contactor to complete the cycle.

In the regeneration cycle, the limestone is sent to a calciner where the limestone is decomposed at high temperature into calcium oxide and carbon dioxide. The carbon dioxide is removed for sequestration at this step. The calcium oxide is then sent to a slaker unit where water is added to convert the calcium oxide into slaked lime. The slaked lime is then sent to the pellet reactor to react with potassium carbonate from the air contactor cycle.

Each step of this process is well understood and used in various industries; however Carbon Engineering's application of the technologies is novel. Currently, Carbon Engineering is estimating a $94-$232 per metric ton of carbon dioxide captured in megaton scale installations.

D. Solid Absorbers

Climeworks and Global Thermostat use solid absorbers. These systems use a large contactor with a material that has an affinity for carbon dioxide. Once the material has become saturated it is regenerated using heat or steam, releasing the $CO_2$ for collection and sequestration. This system has the benefit of not requiring a separate stripper column, however unit production remains at small scale and produced carbon credit costs are high, with Climbworks having a current sale price of $600 per ton of carbon dioxide captured.

E. Ionic Exchange Resins

Ionic exchange resins are used by companies like Infinitree and Carbon Collect. In this system, a resin material is exposed to dry air, which absorbs carbon dioxide from the air. Once the resin has become saturated, it is exposed to high humidity air or a water mist to release the carbon dioxide and regenerate the unit.

Direct Air Capture Systems have the benefit of the fewest moving parts; however they have the disadvantage of requiring air dryers or dry air to operate effectively.

III. Carbon Dioxide Sequestration Methods

A. Geological Sequestration

Geological sequestration involves injecting carbon dioxide into deep geological formations, such as depleted oil or gas reservoirs, deep saline aquifers, or unmineable coal seams. The carbon dioxide is typically compressed into a supercritical state to minimize its volume before injection. Once injected, the carbon dioxide is trapped by various mechanisms, including physical trapping, dissolution in the formation fluids, and mineralization.

B. Ocean Sequestration

Ocean sequestration involves injecting carbon dioxide directly into the deep ocean, where it dissolves in seawater, forming carbonic acid and increasing the ocean's carbon dioxide holding capacity. This method may cause local changes in seawater chemistry and has raised concerns about potential impacts on marine life and ecosystems.

C. Mineral Carbonation

Mineral carbonation involves reacting carbon dioxide with alkaline minerals, such as magnesium or calcium silicates, to form stable carbonate minerals. This process mimics the natural process of mineral weathering and can provide a long-term, stable storage solution for carbon dioxide. However, natural mineral carbonation rates are slow, and accelerating the process through various methods, such as high-temperature or high-pressure conditions, can be energy-intensive.

The systems and methods proposed in the present invention offer an alternative solution for increasing the pH of surface water bodies and enhancing their carbon dioxide capture and holding capacities using calcium sulfate dihydrate, phosphogypsum, or other calcium sulfate predominate sources. These systems and methods aim to improve the efficiency of carbon dioxide capture from the ambient air without requiring a separate sequestration step, thereby lowering costs and increasing scalability as compared with currently available technologies.

BRIEF SUMMARY OF THE INVENTION

The present invention relates generally to the field of carbon capture and sequestration, and more specifically to systems and methods for increasing the pH of surface water bodies to enhance their carbon dioxide capture and holding capacity. The systems and methods employ pure calcium sulfate dihydrate, phosphogypsum, or other calcium sulfate bearing sources which are converted to a calcium oxide bearing mixture. The calcium oxide bearing mixture is then used to elevate the pH of water to allow the water to capture carbon dioxide more rapidly and store more carbon dioxide in solution than would otherwise occur naturally.

The following definitions are intended to aid in the interpretation of this application and the subject matter thereof.

Feedstock—Pure or substantially pure calcium sulfate dihydrate (gypsum), phosphogypsum, or other calcium sulfate predominate sources, or similar source material that have been freed of contaminates detrimental to the system or end product (examples include debris, oils, radioisotopes, etc.) (similar source material refers to any material that has a sufficient level of calcium sulfate to make it practical to convert it into calcium oxide) (the system could be run with a lower grade feedstock and in such a case the overall conversion rate would be lower)

Dry Feedstock—Feedstock which has had the calcium sulfate dihydrate within either fully or partially converted into anhydrous calcium sulfate Mixfeed—a calcium oxide bearing mixture or fully calcium oxide source Waste Mixfeed—Components with low water solubility remaining after Mixfeed is combined with water Cook Vapor—a vapor mixture comprised primarily of (1) sulfur trioxide or (2) sulfur trioxide, sulfur dioxide, and oxygen molecules Basic Capture Media—Water with an elevated pH (between 8 and 13)

Buffered Water—Water with an elevated pH safe for discharge into the capture area Surface Water Body—An area of water, either natural or man-made, where water can contact ambient air. For the purposes of this application this term is size agnostic, for example both the Pacific Ocean and a retention pond would be equally considered with the term Surface Water Body. Additionally, for the purposes of this application, both unenclosed and enclosed water areas would be equally considered with the term Surface Water Body.

Capture Area—water body with an elevated pH level for capturing carbon dioxide

System Components

In one or more embodiments of the present invention, the system and method for increasing the pH of surface water bodies, in its primary form, comprises the following steps (see FIG. 1):

Dehydration Step 1: In the Dehydration Step, feedstock (for example, gypsum or calcium sulfate dihydrate) is dehydrated so that it is converted into Dry Feedstock (anhydrous calcium sulfate when starting with gypsum or calcium sulfate dihydrate). This can be accomplished under various temperatures, humidities, and durations of time sufficient to dehydrate the feedstock. In one or more embodiments, the Dehydration Step is designed to heat Feedstock to a typical target temperature between 200° C. and 1000° C., converting it into Dry Feedstock by driving off water molecules attached to the Feedstock. The specific target temperature can vary, depending on the feedstock and equipment used. For example, if crucible material that is very moisture sensitive is used, such material could require a low heating temperature for a longer time in order to avoid cracking. Also, a feedstock could have certain impurities that require a certain minimum temperature to remove. This step may be completed using equipment such as electric furnaces, indirect fired ovens, or heat exchangers using heat transfer media, as examples. As temperature and residence time in both the Dehydration Step and the Cooking Step directly impacts the amount of calcium oxide in the Mixfeed, a wide degree of temperature rangeability may be required for this step in order to optimize the Mixfeed makeup (i.e. there may be circumstances under which it is more economical or optimal for the Mixfeed to have higher or lower percentages of calcium oxide).

Cooking Step 2: The Cooking Step receives the Dry Feedstock (i.e. anhydrous calcium sulfate) from the Dehydration Step and heats it to remove the sulfur from the Dry Feedstock. Preferably, it heats the dry feedstock to a temperature between 1000° C. and 1800° C. More preferably, it heats it to a temperature between 1200° C. and 1400° C. This step may be completed using equipment such as electric furnaces, indirect fired ovens, or heat exchangers using heat transfer media as examples. As temperature and residence time in both the Dehydration Step and the Cooking Step directly impacts the amount of calcium oxide in the Mixfeed, a wide degree of temperature rangeability may be required for this step in order to optimize the Mixfeed makeup (i.e. there may be circumstances under which it is more economical or optimal for the Mixfeed to have higher or lower percentages of calcium oxide.)

The inventor has determined that Dehydration Step 1 and Cooking Step 2 can be combined in a single step by subjecting the Feedstock to a certain amount of heat for a certain amount of time. That is, at temperatures high enough to "cook" the Dry Feedstock, the Feedstock can be both dehydrated and "cooked", resulting in Mixfeed (i.e. calcium oxide) necessary for the subsequent steps.

Cooling Step 3: The Cooling Step 3 receives the Mixfeed from the Cooking Step and cools it to ambient or near ambient temperature before it is used in the creation of Basic Capture Media. This step may be completed using equipment such as heat exchangers using heat transfer media, as an example, or by allowing the Mixfeed to cool naturally to the environment, for example.

Capture Media Creation Step 4: The Capture Media Creation Step 4 mixes the cooled Mixfeed in water to create a Basic Capture Media, comprising water, calcium cations, and hydroxide anions. This solution has an elevated pH ranging from 8 to 13, depending on the desired concentrations and mix ratios required to optimize direct air carbon capture effectiveness. This step could be accomplished using, as examples, batch mixers or slurry pump loops.

Discharge to Capture Area 5: In the Discharge Step (Discharge to Capture Area 5) the Basic Capture Media or Buffered Water (see discussion regarding FIG. 2) is discharged into a surface water body to increase its pH, leading to an increase in the carbon dioxide uptake rate from the ambient air. The Basic Capture Media may or may not need to be pumped to the surface water body depending on the proximity of the system site and the hydrology of the surface water body.

In other embodiments, as explained in the detailed description, additional steps can be implemented in the method of capture or system in order to recycle and/or otherwise utilize products of the system or create a more efficient system.

The following equations represent various steps in one or more embodiments of the present invention (creation of calcium sulfate from gypsum, creation of calcium oxide from calcium sulfate, and an optional step of creating sulfuric acid):

$$CaSO_4 \ast 2H_2O + heat \rightarrow CaSO_4 + 2H_2O$$

$$CaSO_4 + heat \rightarrow CaO + SO_3$$

$$SO_3 + H_2O \rightarrow H_2SO_4 + heat$$

The chemistry and kinetics of atmospheric carbon dioxide absorption by surface waters are commonly known. For additional information reference, please see the following sources, each which is hereby incorporated herein by reference:

IPCC Special Report on Carbon dioxide Capture and Storage; Section 6.2.1.1

Decreasing Atmosphere $CO_2$ by Increasing Ocean Alkalinity; Prof. Gideon Henderson, Dr. Ros Rickaby, Dr. Heather Bouman; October $2^{nd}$, 2008

The term "step" in this application simply means stages in processing and does not necessarily imply segregated components, as multiple "steps" could be potentially accomplished using a single piece of equipment, at the same time.

In one or more embodiments, the present invention comprises a system for increasing the pH of surface water bodies to enhance carbon dioxide capture and holding capacity, comprising a dehydration step, a cooking step, a cooling step, a capture media creation step, a proportioning and discharge step, a hydration step, and a disposal step.

In one or more embodiments, a dehydration step converts calcium sulfate dihydrate into calcium sulfate anhydrate.

In one or more embodiments, a cooking step decomposes anhydrous calcium sulfate into solid calcium oxide and a vapor comprising sulfur trioxide, sulfur dioxide, and oxygen.

In one or more embodiments, a cooling step cools the solid calcium oxide to ambient or near ambient temperature.

In one or more embodiments, a capture media creation step dissolves the solid calcium oxide in water to create a buffered solution comprising water, calcium cations, and hydroxide anions.

In one or more embodiments, a proportioning and discharge step blends the buffered solution with additional water to create a buffered water mixture and discharges the mixture into a surface water body to create a capture area.

In one or more embodiments, a hydration step mixes the vapor from the cooking step with water to create sulfuric acid.

In one or more embodiments, a disposal step decomposes any unused vapor from the cooking step into elemental sulfur and oxygen for long-term storage.

In one or more embodiments, the dehydration step heats the calcium sulfate dihydrate to a temperature between 200° C. and 1000° C. Other suitable ranges can be applied, as the dehydration step is determined both by the temperature and the duration.

In one or more embodiments, the dehydration step heats the calcium sulfate dihydrate to a temperature between 500° C. and 1000° C.

In one or more embodiments, the cooking step heats the anhydrous calcium sulfate to a temperature between 1000° C. and 1800° C.

In one or more embodiments, the capture media creation step produces a buffered solution with a pH ranging from 8 to 13.

In one or more embodiments, the proportioning and discharge step creates a buffered water mixture with a pH between 8 and 9.

In one or more embodiments, the surface water body is fully contained, allowing the capture media to be used without mixing in additional water to capture carbon dioxide from the air.

In one or more embodiments, a method for increasing the pH of surface water bodies to enhance carbon dioxide capture and holding capacity is provided, comprising the steps of: dehydrating calcium sulfate dihydrate to form calcium sulfate anhydrate; cooking calcium sulfate anhydrate to decompose it into solid calcium oxide and a vapor comprising sulfur trioxide, sulfur dioxide, and oxygen; cooling (or allowing to cool) the solid calcium oxide; creating capture media by dissolving the cooled solid calcium oxide in water; and proportioning the capture media by blending it with additional water to create a buffered water mixture and discharging the mixture into a surface water body.

In one or more embodiments, the aforementioned method for increasing the pH of surface water bodies to enhance carbon dioxide capture and holding capacity can include the following additional steps: hydrating the vapor from the cooking step to create sulfuric acid; and disposing of any unused vapor from the cooking step by decomposing it into elemental sulfur and oxygen for long-term storage.

In one or more embodiments, the dehydration step heats the calcium sulfate dihydrate to a temperature between 200° C. and 1000° C.

In one or more embodiments, the dehydration step heats the calcium sulfate dihydrate to a temperature between 200° C. and 500° C.

In the present invention, in certain embodiments, the cooking step heats the calcium sulfate anhydrate to a temperature between 1000° C. and 1800° C.

In one or more embodiments, the capture media creation step produces a buffered solution with a pH ranging from 8 to 13.

In one or more embodiments, the proportioning and discharge step creates a buffered water mixture with a pH between 8 and 9. The actual pH may be higher or lower depending on the surface water body's makeup.

In one or more embodiments, wherein the surface water body is fully contained, the capture media is allowed to be used without mixing in additional water to capture carbon dioxide from the atmosphere.

In one or more embodiments, a method for enhancing carbon dioxide capture capacity of bodies of water is provided, comprising the following steps: heating calcium sulfate dihydrate until solid calcium oxide is produced; dissolving the calcium oxide in water to create a capture media; and injecting the capture media in a surface body water to increase the pH of the water of the surface water body.

In one or more embodiments, a method for enhancing carbon dioxide capture capacity of bodies of water is provided, wherein prior to dissolving the calcium oxide in water, the calcium oxide is cooled to ambient temperature.

In one or more embodiments, a method for removing ambient carbon dioxide from the air is provided, the method utilizing any of the prior methods of increasing carbon dioxide capacity or increasing the pH of bodies of water.

In one or more embodiments, a system for ambient carbon dioxide removal is provided, the system comprising any of the prior methods.

In one or more embodiments, a method for enhancing carbon dioxide capture capacity of bodies of water is provided, the method comprising the following steps: heating gypsum, phosphogypsum, or other calcium sulfate predominate sources until solid calcium oxide is produced; dissolving the calcium oxide in water to create a capture media; and mixing the capture media in a surface body water to increase the pH of the water of the surface water body, and thus, the carbon dioxide capture capacity.

In one or more embodiments of the present invention, a method and system for preparing solid calcium oxide from gypsum is provided, the method and system comprising the aforementioned steps related to increasing carbon dioxide capture.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
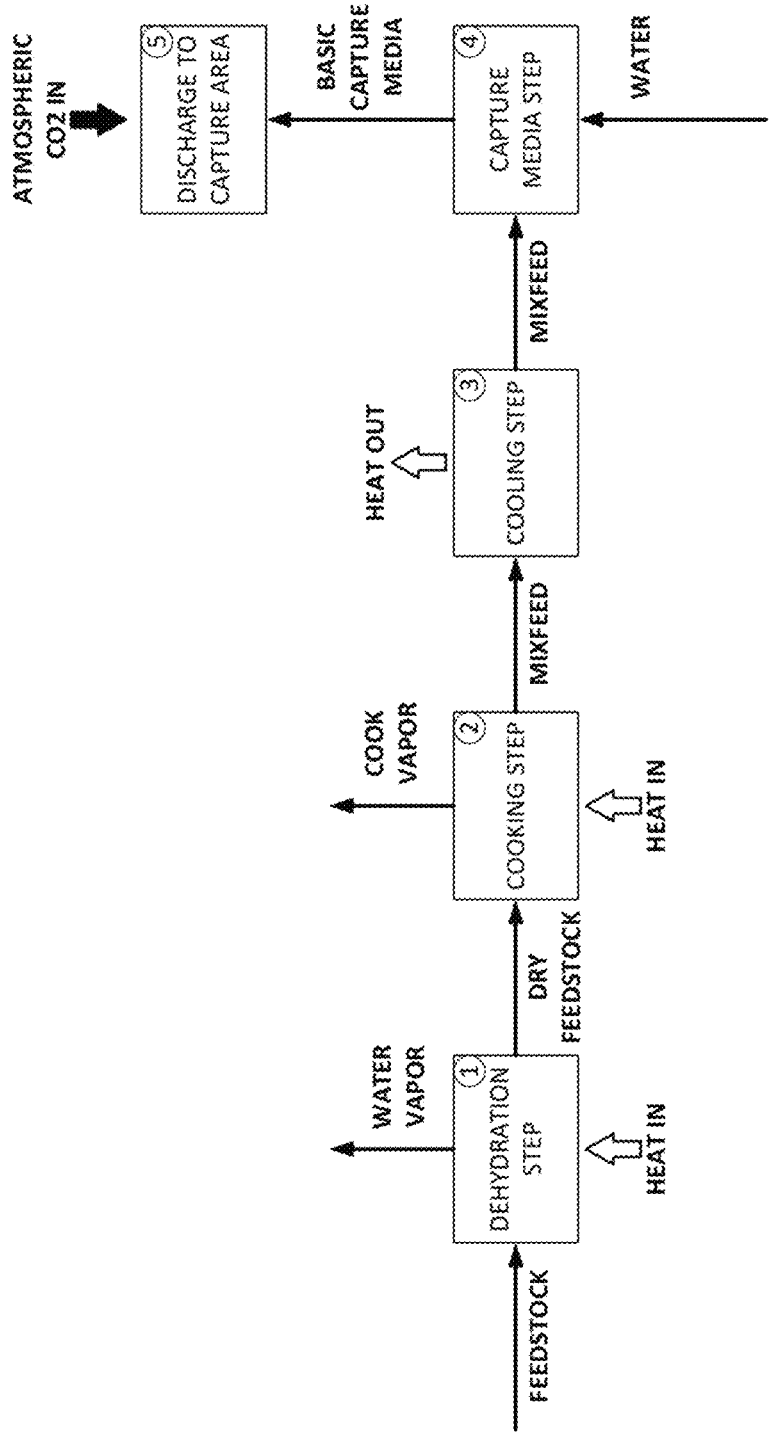
FIG. 1 is a flow chart of a first embodiment of the system/method of the present invention.

FIG. 1 is a flow chart of a first and basic embodiment of a method of carbon dioxide capture and a system for accomplishing same. The flow chart in FIG. 1 shows steps included in various embodiments of the present invention. Specifically, FIG. 1 shows steps included in systems and methods of the present invention for increasing the pH of surface water bodies to enhance carbon dioxide capture and holding capacity. The steps set forth in FIG. 1 are common to each of the embodiments of the present invention, except that the dehydration step 1 and cooking step 2, shown as different steps in FIG. 1 and FIGS. 2-5, can be combined into a single step, as seen in FIG. 6. That is, the inventor has determined that providing a sufficient amount of heat for a certain amount of time (for example, heating the feedstock to 1350° C. for 1080 minutes) can both dehydrate the feedstock and subsequently cook the dry feedstock resulting in the Mixfeed, in a single step. As seen in FIG. 1, each of the five steps of the first and basic embodiment is provided.

A method for carbon dioxide capture begins by dehydrating and cooking the Feedstock (as previously noted, this can be combined in a single step). Dehydration Step 1 is designed to dehydrate the Feedstock to convert it to Dry Feedstock. For example, one may heat Feedstock to a typical target temperature between 200° C. and 1000° C., converting it into Dry Feedstock by driving off water molecules attached to the Feedstock. The specific temperature and duration of heating can vary. For example, heating at a lower temperature would require a longer duration of heating than heating at a higher temperature for a shorter duration. The dehydration step may be completed using equipment such as electric furnaces, indirect fired ovens, or heat exchangers using heat transfer media, for example. As temperature and residence time in both the Dehydration Step and the Cooking Step directly impacts the amount of calcium oxide in the Mixfeed, a wide degree of temperature rangeability may be required for this step in order to optimize the Mixfeed makeup (i.e. there may be circumstances under which it is more economical or optimal for the Mixfeed to have higher or lower percentages of calcium oxide). Running at perfect conversion rates, the system at scale would produce a lot of sulfuric acid—effectively half of the mass of feedstock going into the plant would come out as sulfuric acid. If there is insufficient demand for the sulfuric acid, it may be more profitable to run the system at lower conversion efficiencies and produce more solid waste (which would be non-toxic and could be landfilled or stacked) instead of excess sulfuric acid (which would have to have special transportation and storage). Higher temperature and longer duration may increase the amount of calcium oxide, however if temperature is too high the calcium sulfate in the Feedstock or Dry Feedstock can fuse into a high temperature stable calcium sulfate instead of calcium oxide.

During the dehydration step, the Feedstock is considered Dry Feedstock once the moisture content of the Dry Feedstock has been substantially removed. This can be known, for example, by checking the water content of the resultant vapor discharge (once the resultant vapor discharge reaches or approaches 0 ppm the Feedstock would be Dry Feedstock.) The goal in the dehydration step is to get the feedstock as dry as reasonably practical based on equipment and economics. If some of the feedstock is in a hemi-hydrate form, such feedstock would not prevent the system from working, but would simply lower the over efficiency of conversion.

After the Feedstock is dried during the dehydration step, the Cooking Step 2 receives the Dry Feedstock from the Dehydration Step and heats the Dry Feedstock to a temperature, preferably between 1000° C. and 1800° C., to remove the sulfur from the Dry Feedstock. This step may be completed using equipment such as electric furnaces, indirect fired ovens, or heat exchangers using heat transfer media, for example. For example, this step can be accomplished using the same apparatus as that used during the dehydration step and as noted, could be combined with the dehydration step. For example, the inventor has determined during experimentation that desulfurization can be accomplished in a single step (going from ambient temperature to 1350° C., for example, skipping the intermediate step of first dehydrating the Feedstock). In certain testing, the inventor tested a dehydration step at 400° C. and a cooking step at 1200° C. and 1400° C. (in two separate steps), without successful results. These suggest that the single step may be limited to temperatures with a range within the larger range of 1200° C. and 1400° C. This single step desulfurization can be accomplished at temperatures in the same range as the high temperature in the two-step process.

As temperature and residence time in both the Dehydration Step and the Cooking Step directly impacts the amount of calcium oxide in the Mixfeed, a wide degree of temperature rangeability may be required for this step in order to optimize the Mixfeed makeup (i.e. there may be circumstances under which it is more economical or optimal for the Mixfeed to have higher or lower percentages of calcium oxide.)

After the Feedstock has been heated sufficiently to both dehydrate (resulting in dry feedstock) and cook the dry feedstock, resulting in Mixfeed, the Mixfeed must be sufficiently cooled before it is used in the creation of Basic Capture Media. Cooling occurs so that the Basic Capture Media/Buffered Water does not hurt wildlife or boil off. That is, during the Cooling Step 3, the Mixfeed from the Cooking Step is received and cooled to ambient or near ambient temperature before it is used in the creation of Basic Capture Media. This step may be completed using equipment such as heat exchangers using heat transfer media, as an example, or by allowing the Mixfeed to cool naturally to the environment. Preferably, the Mixfeed is cooled to 30° C.-50° C. This temperature may vary depending on the ratio of Mixfeed to water used to create the Basic Capture Media.

After the Mixfeed is sufficiently cooled, cooled Mixfeed is mixed in water to create a Basic Capture Media (see Capture Media Step 4), comprising water, calcium cations, and hydroxide anions. This solution has an elevated pH, preferably ranging from 8 to 13, the pH depending on the desired concentrations and mix ratios required to optimize direct air carbon capture effectiveness. The concentrations and ratios are going to be site dependent, dependent on what permits will allow and dependent on the capture body of water. This step could be accomplished using, as examples, agitators, batch mixers or slurry pump loops. The Mixfeed could also be placed in a water body and allowed to naturally dissolve without mechanical means.

After the Basic Capture Media is created, the method undergoes the Discharge to Capture Area 5 step. In the Discharge Step 5, the Basic Capture Media or Buffered Water (see discussion regarding Buffered Water, below) is discharged into a surface water body to increase the pH of the surface water body, leading to an increase in the carbon dioxide uptake rate from the ambient air. The Basic Capture Media may or may not need to be pumped to the surface water body depending on the proximity of the system site and the hydrology of the surface water body.

Figure 8:
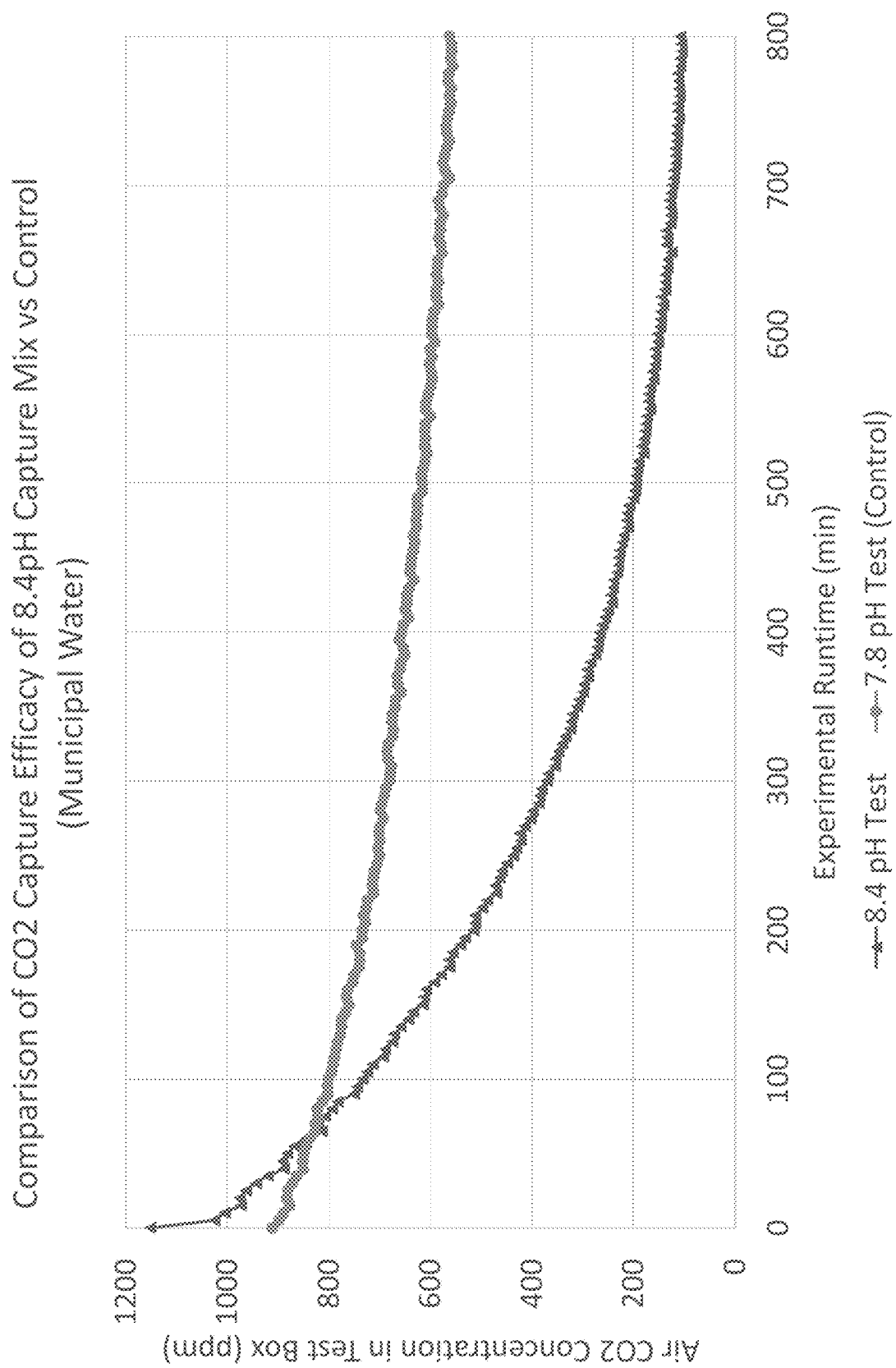
FIG. 8 shows a Comparison of $CO_2$ Capture Efficacy of 8.4 pH Capture Mix vs Control (Municipal Water).

FIG. 8 shows a Comparison of $CO_2$ Capture Efficacy of 8.4 pH Capture Mix vs Control (Municipal Water). As seen in FIG. 8, the capture efficacy was greatly increased with the 8.4 pH Capture Mix as compared with the 7.8 pH Municipal Water, with the air concentration of $CO_2$ in the test conducted with Municipal Water being approximately 550 ppm after 800 minutes, while the air concentration of $CO_2$ in the test conducted with Capture Mix was approximately 100 ppm after 800 minutes, despite starting off higher. The example shown in FIG. 8 was done in a test chamber consisting of two IP67 rated plastic containers mated together (one on bottom, one on top). The lower chamber contained the capture media. The upper chamber held the $CO_2$ monitor. Holes allowed air to pass from one chamber to another and a fan was installed to create circulation for proper measurement. All penetrations into the container were caulked as was the mating area between the two containers to prevent air ingress/egress once the top was locked.

Flow through the basic embodiment of the system (set forth in FIG. 1—see FIG. 3 and discussion regarding same regarding use of Waste Mixfeed) would be as follows: Feedstock and/or Waste Mixfeed would be sent to the Dehydration Step (1) where the Feedstock would be heated and converted into Dry Feedstock. The Dry Feedstock would then move to the Cooking Step (2) where it would be desulfurized and converted into Mixfeed. The Mixfeed would then move to the Cooling Step (3) for cooling. This cooled Mixfeed would then move to the Capture Media Step (4) where the Mixfeed would be combined with water to create Basic Capture Media. The Basic Capture Media would then be released into the Capture Area (5) where it would absorb Atmospheric $CO_2$ from the ambient air until the Basic Capture Media reaches equilibrium pH. All absorbed $CO_2$ would remain in solution in the water.

This method was employed at laboratory scale using small samples of pure calcium sulfate which were heated inside of a ventilated programmable muffle furnace inside of a quartz ceramic crucible to an initial temperature of 400° C. for 300 minutes (Dehydration Step) then the temperature was increased to between 1300° C. and 1400° C. and held for between 360 minutes and 480 minutes (Cooking Step). The sample was then allowed to cool inside of the muffle furnace as the muffle furnace ramped down to ambient temperature (Cooling Step). The crucible was removed from the muffle furnace and the sample was removed from the crucible, crushed, and mixed with municipal tap water with a measured pH of 7.6-7.7 (Capture Media Step). The addition of the crushed sample resulted in an immediate increase in water pH to 8.05-8.45, depending on test parameters, with pH readings above 9 when the sample was allowed to dwell in the water for extended durations (24 hours or more).

In one or more embodiments of this invention, an additional step, the Capture Media Proportioning Step 6 is added to the system and method to facilitate discharge into waterways with marine life (see FIG. 2):

The Capture Media Proportioning Step 6 blends the Basic Capture Media with additional water to create a Buffered Water mixture. This Buffered Water has a pH low enough not to adversely impact marine life or the environment but higher than the pH of the ambient water (typically between 8 and 9, although it may ultimately range higher or lower depending on the surface water make up). This step may be completed using typical flow control metering and valving or pumping assemblies.

Figure 2:
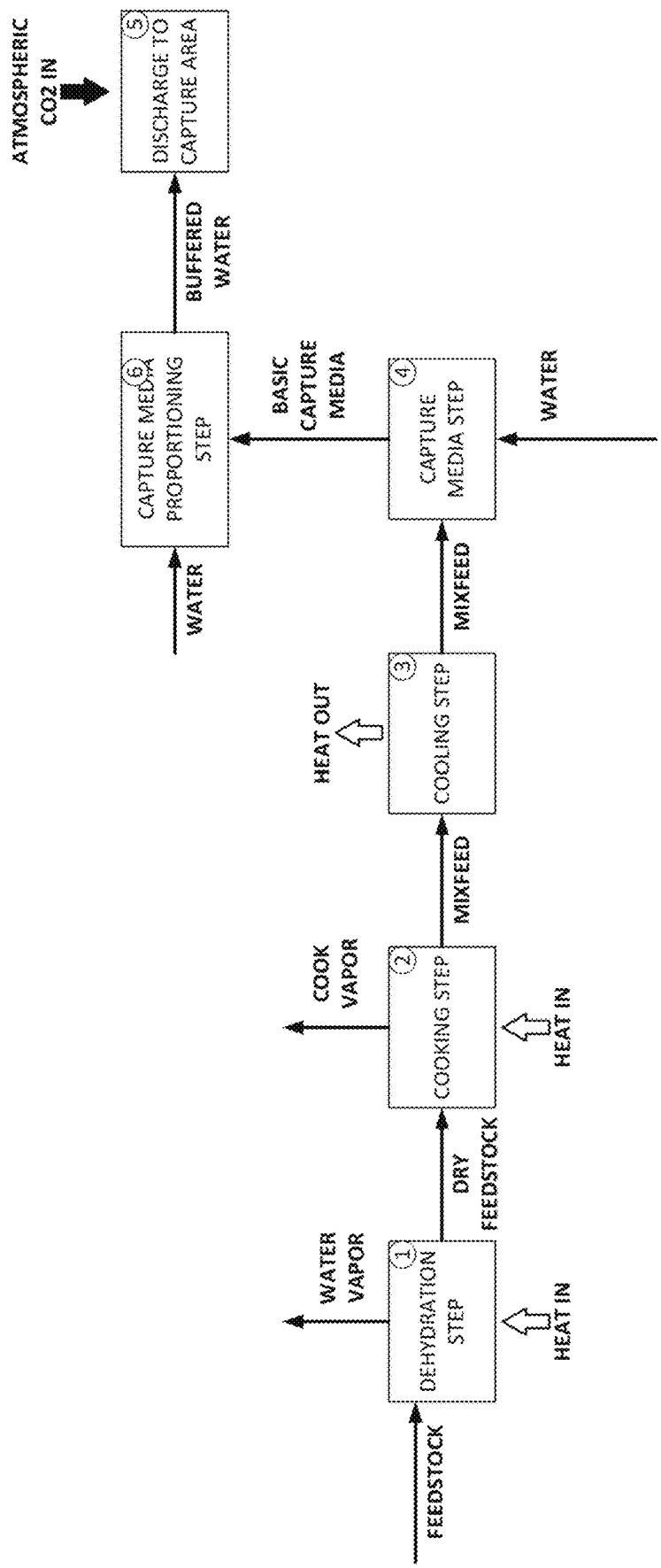
FIG. 2 is a flow chart of a second embodiment of the system/method of the present invention.

Flow through the embodiment of the system shown in FIG. 2 would be as follows: Feedstock and/or Waste Mixfeed would be sent to the Dehydration Step (1) where the Feedstock would be heated and converted into Dry Feedstock. The Dry Feedstock would then move to the Cooking Step (2) where it would be desulfurized and converted into Mixfeed. The Mixfeed would then move to the Cooling Step (3) for cooling. This cooled Mixfeed would then move to the Capture Media Step (4) where the Mixfeed would be combined with water to create Basic Capture Media. The Basic Capture Media would then move to the Capture Media Proportioning Step (6) where the Basic Capture Media would be mixed with additional water to create Buffered Water. This Buffered Water would then be released into the Capture Area (5) where it would absorb Atmospheric $CO_2$ from the ambient air until the capture area (buffered water or buffered water combined with surface water) reaches equilibrium pH. All absorbed $CO_2$ would remain in solution in the water.

Figure 3:
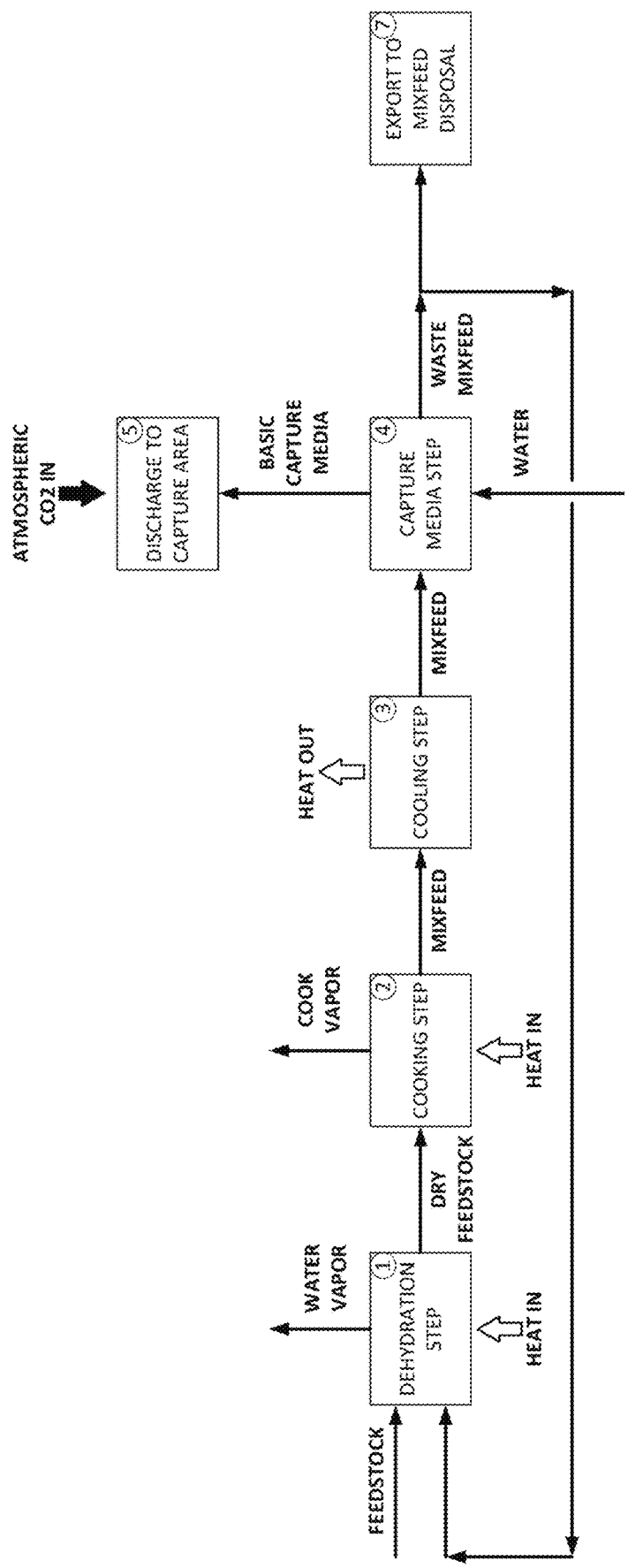
FIG. 3 is a flow chart of a third embodiment of the system/method of the present invention.

In one or more embodiments of this invention an additional step, Export to Mixfeed Disposal 7, is added to the system and method to facilitate reprocessing and disposal of any Waste Mixfeed created (see FIG. 3).

The Export to Mixfeed Disposal 7 Step would send Waste Mixfeed to a disposal site. Waste Mixfeed could be sent to a solids waste disposal facility or, if deemed suitable, used as landfill. Additional uses for the Waste Mixfeed may become viable depending on the ultimate composition of the Waste Mixfeed.

Flow through the embodiment of the system shown in FIG. 3 would be as follows: Feedstock and/or Waste Mixfeed would be sent to the Dehydration Step (1) where the Feedstock would be heated and converted into Dry Feedstock. The Dry Feedstock would then move to the Cooking Step (2) where it would be desulfurized and converted into Mixfeed. The Mixfeed would then move to the Cooling Step (3) for cooling. This cooled Mixfeed would then move to the Capture Media Step (4) where the Mixfeed would be combined with water to create Basic Capture Media. The Basic Capture Media would then be released into the Capture Area (5) where it would absorb Atmospheric $CO_2$ from the ambient air until the Basic Capture Media reaches equilibrium pH. All absorbed $CO_2$ would remain in solution in the water.

Waste Mixfeed from the Capture Media Step (4) would either be returned to the Dehydration Step (1) for reprocessing and/or sent to Export to Mixfeed Disposal (7) depending on the composition of the Waste Mixfeed and suitability for alternative use. Although only FIG. 3 depicts the possible use of Waste Mixfeed and Export to Mixfeed Disposal, each of the embodiments herein can include such additional steps as additional embodiments.

Figure 4:
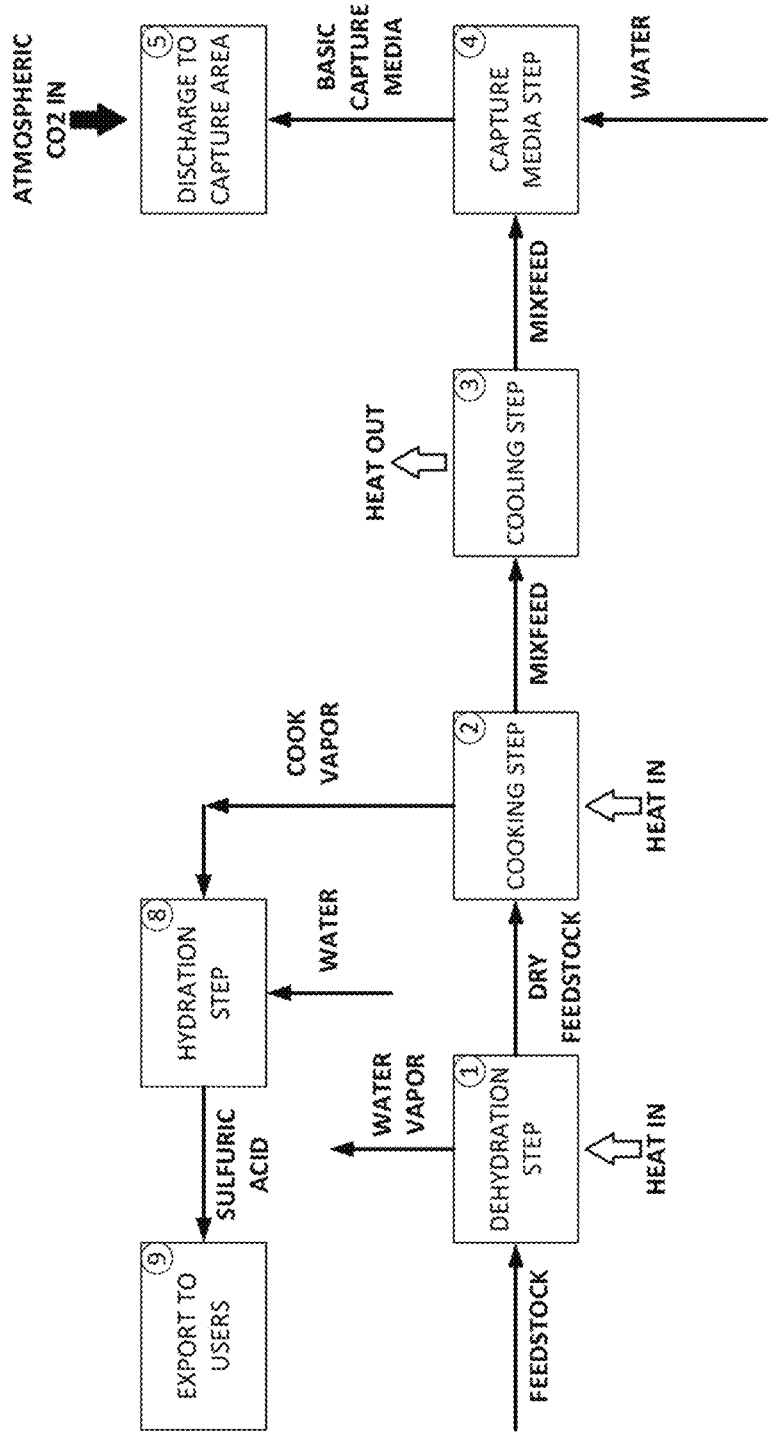
FIG. 4 is a flow chart of a fourth embodiment of the system/method of the present invention.

In one or more embodiments of this invention an additional step is added to the system and method to convert Cook Vapor into sulfuric acid for export to users (see FIG. 4).

As seen in FIG. 4, the Hydration Step 8 mixes the vapor from the Cooking Step with water from the Dehydration Step or another water source to create sulfuric acid for export to users. This step may be completed using equipment such as water mist spray systems or liquid filled contactors, for example. This step may also include heat exchangers for cooling purposes.

The Export to Users Step 9 would send sulfuric acid to users. Potential users could include phosphate mining operations. Additionally, excess sulfuric acid could be converted to an oleum phase temperature stable enough for long term storage (see https://info.veolianorthamerica.com/hubfs/offers/info-sheets/industrial/sulfur-trioxide-and-oleum-push-information.pdf and https://www.chemeurope.com/en/encyclopedia/Oleum.html, each incorporated herein by reference).

Flow through embodiments of the system as seen in FIG. 4 would be as follows: Feedstock and/or Waste Mixfeed would be sent to the Dehydration Step (1) where the Feedstock would be heated and converted into Dry Feedstock. The Dry Feedstock would then move to the Cooking Step (2) where it would be desulfurized and converted into Mixfeed. The Mixfeed would then move to the Cooling Step (3) for cooling. This cooled Mixfeed would then move to the Capture Media Step (4) where the Mixfeed would be combined with water to create Basic Capture Media. The Basic Capture Media would then be released into the Capture Area (5) where it would absorb Atmospheric $CO_2$ from the ambient air until the Basic Capture Media reaches equilibrium pH. All absorbed $CO_2$ would remain in solution in the water. Cook Vapor from the Cooking Step (2) would be sent to the Hydration Step (8) and combined with water to create sulfuric acid. This sulfuric acid would be sent to Export to Users (9).

Figure 5:
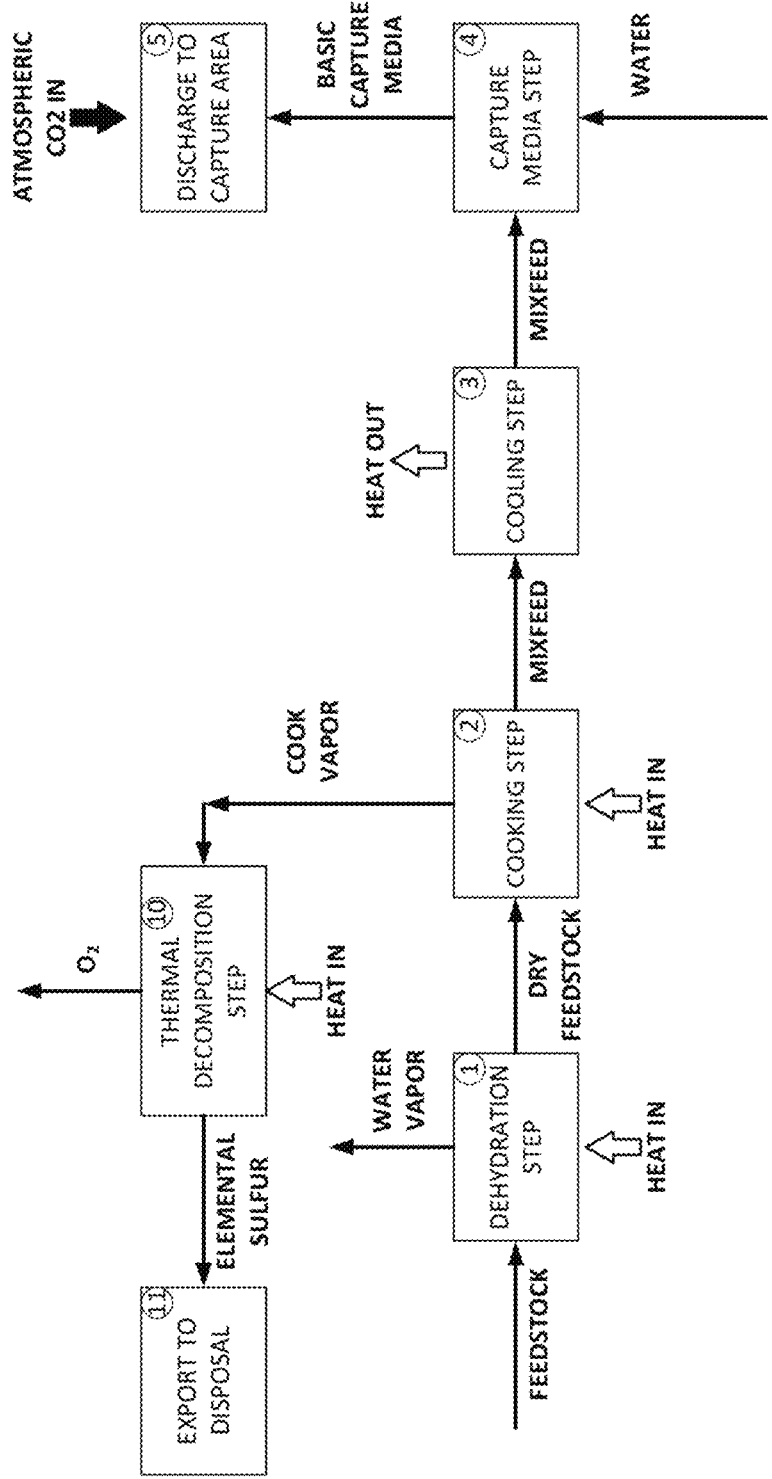
FIG. 5 is a flow chart of a fifth embodiment of the system/method of the present invention.
Figure 6:
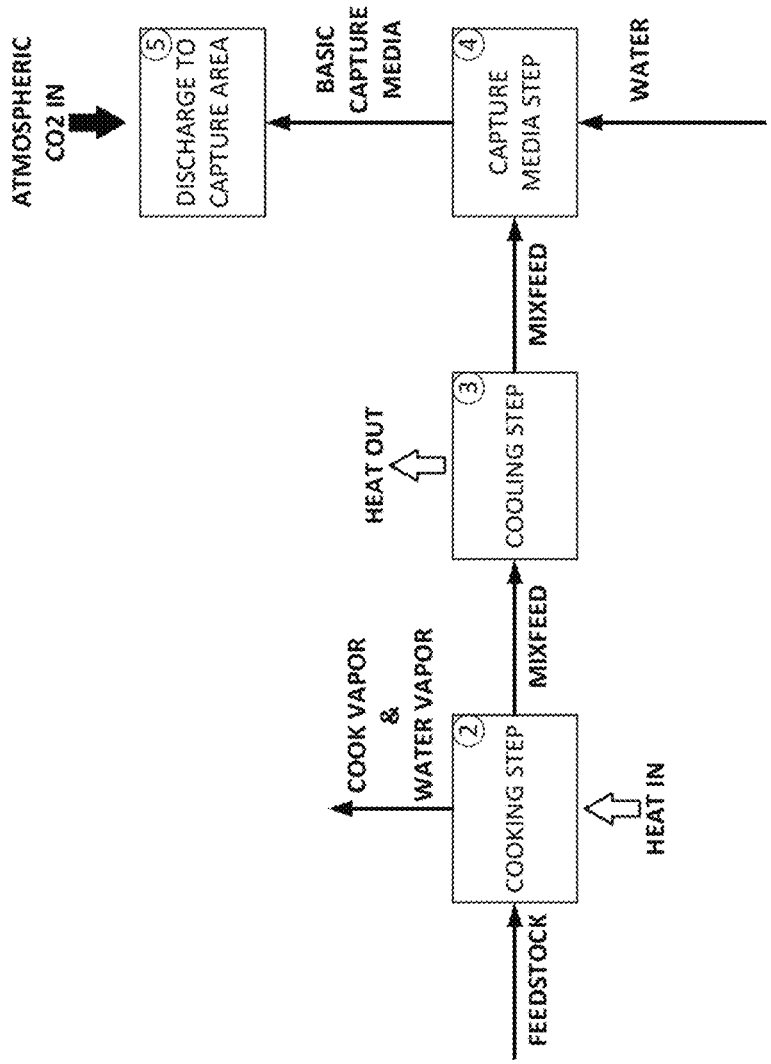
FIG. 6 is a flow chart of a sixth embodiment of the system/method of the present invention.
Figure 7:
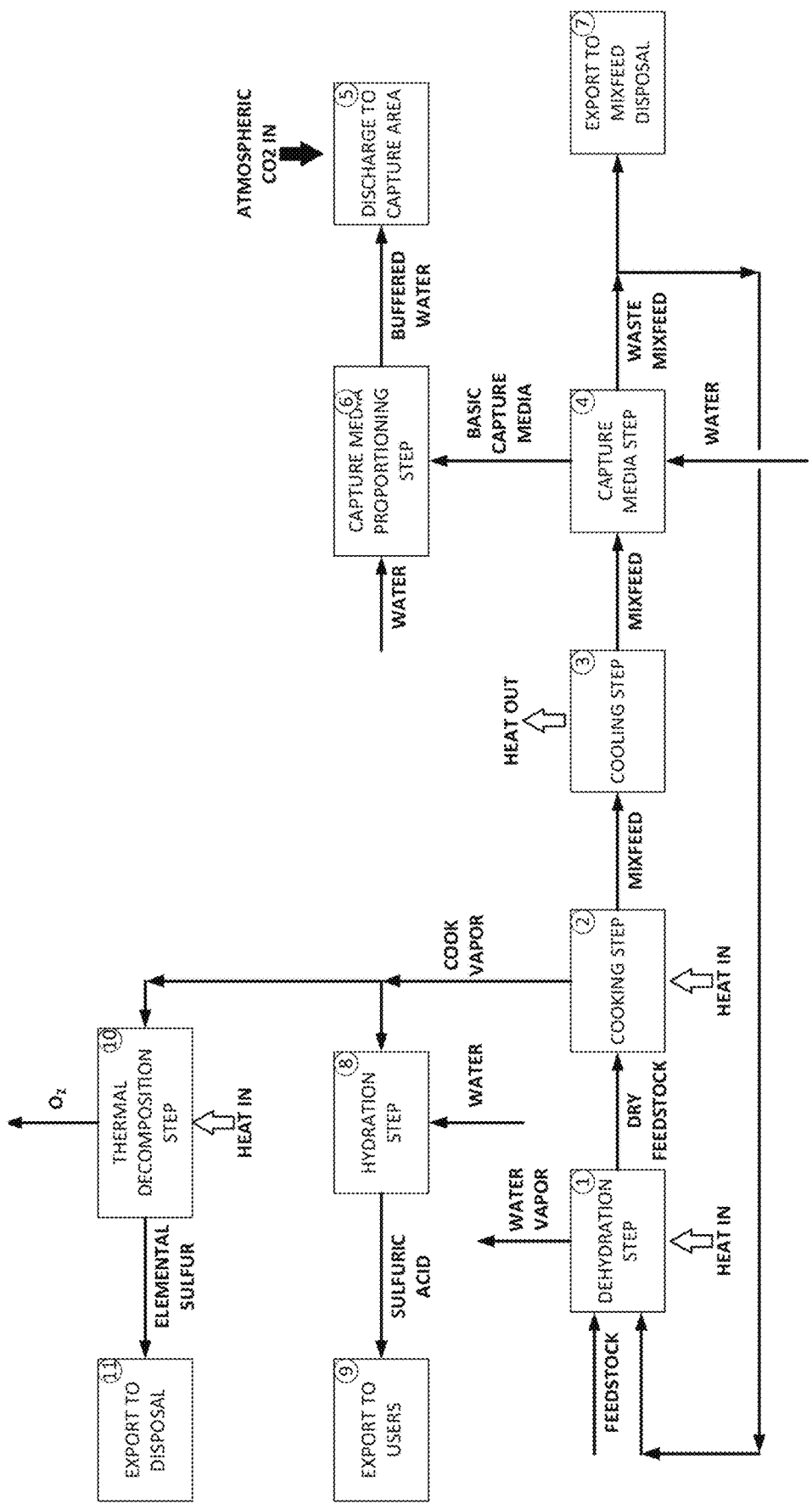
FIG. 7 is a flow chart of a seventh embodiment of the system/method of the present invention.

In one or more embodiments of this invention an additional step is added to the system and method to convert Cook Vapor into elemental sulfur for disposal (see FIG. 5). The Thermal Decomposition Step 10 would thermally decompose Cook Vapor into elemental sulfur and oxygen. This could be accomplished with equipment such as regenerative thermal oxidizers. The Export to Disposal Step 11 would send elemental sulfur to be transported to a disposal site for long-term storage or alternatively to users, if demand is present. This step is modeled by the equations below:

$2)SO_3+Heat=(2)S+(3)O_2$ $(2)SO_3+790\ kJ=(2)S+(3)O_2$

Flow through the embodiment of the system shown in FIG. 5 would be as follows: Feedstock and/or Waste Mixfeed would be sent to the Dehydration Step (1) where the Feedstock would be heated and converted into Dry Feedstock. The Dry Feedstock would then move to the Cooking Step (2) where it would be desulfurized and converted into Mixfeed. The Mixfeed would then move to the Cooling Step (3) for cooling. This cooled Mixfeed would then move to the Capture Media Step (4) where the Mixfeed would be combined with water to create Basic Capture Media. The Basic Capture Media would then be released into the Capture Area (5) where it would absorb Atmospheric $CO_2$ from the ambient air until the Basic Capture Media reaches equilibrium pH. All absorbed $CO_2$ would remain in solution in the water. Cook Vapor from the Cooking Step (2) would be sent to the Thermal Decomposition Step (10) where heat would be added to break down the Cook Vapor into elemental sulfur and oxygen. The elemental sulfur would then be sent to Export to Disposal (11). Oxygen created in the process would be released to the atmosphere.

In one or more embodiments of this invention, preferably heat can be recovered from the Cooling Step (3), Hydration Step (8), and/or Thermal Decomposition Step (10) for use in the Dehydration Step (1), Cooking Step (2), and/or site utility needs to assist in lowering the operating costs of the system. This could be accomplished in a number of ways, including use of a fluid heat media system with heat exchangers and/or use of solid heat capture systems such as high heat capacity ceramic packings. Additionally, one or more parallel processing trains and/or processing stations may be required to optimize heat recovery.

As seen in FIG. 6, the dehydration step 1 and cooking step 2 can be combined into a single Cooking Step 2, with the remaining steps the same as those seen in FIG. 1.

The described system and method may be implemented as batch operation, where, for example, a vessel containing the Feedstock is heated and cooled, or as a continuous operation, where, for example, the Feedstock is moved from one heating or cooling station to the next, or as a combination of the two where a portions of the steps are conducted as batch operations and a portion of the steps are conducted as continuous operations.

In certain embodiments, forced air circulation systems such as, for example, fans or blowers, may be used to circulate air above the Surface Water Body to increase the efficiency of atmospheric $CO_2$ capture.

Since some properties of the Feedstock may vary based on source and Feedstock composition, in certain embodiments additional milling or grinding steps may be required between steps for the Feedstock, Dry Feedstock, Mixfeed, and/or Waste Mixfeed.

The described systems and methods offer a novel approach to enhancing the carbon dioxide capture and holding capacity of surface water bodies by increasing their pH, leveraging calcium sulfate dihydrate, phosphogypsum, or other calcium sulfate predominate sources. The invention aims to improve the efficiency of carbon dioxide capture from ambient air without requiring a separate sequestration step while minimizing adverse environmental impacts.

The invention claimed is:

1. A method for increasing the pH of a surface water body to enhance carbon dioxide capture and holding capacity, comprising the steps of: a. dehydrating calcium sulfate dihydrate to form calcium sulfate anhydrate; b. cooking the calcium sulfate anhydrate to decompose it into solid calcium oxide and a vapor comprising sulfur trioxide, sulfur dioxide, and oxygen; c. cooling the solid calcium oxide; d. creating capture media by dissolving the cooled solid calcium oxide in water; and e. proportioning the capture media by blending it with additional water to create a buffered water mixture and discharging the mixture into the surface water body.

2. The method of claim 1, further comprising the following steps: f. hydrating the vapor from the cooking step "b" to create sulfuric acid; and g. disposing of any unused vapor from the cooking step "b" by decomposing it into elemental sulfur and oxygen for long-term storage.

3. The method of claim 1, wherein the dehydration step "a" heats the calcium sulfate dihydrate to a temperature between 200° C. and 1000° C.

4. The method of claim 3, wherein the dehydration step "a" heats the calcium sulfate dihydrate to a temperature between 200° C. and 500° C.

5. The method of claim 1, wherein the cooking step "b" heats the calcium sulfate anhydrate to a temperature between 1000° C. and 1800° C.

6. The method of claim 1, wherein the capture media creation step "d" produces a buffered solution with a pH ranging from 8 to 13.

7. The method of claim 1, wherein the proportioning and discharge step "e" creates a buffered water mixture with a pH between 8 and 9.

8. The method of claim 1, wherein the surface water body is fully contained, allowing the capture media to be used without mixing in additional water to capture carbon dioxide from the atmosphere.

9. A method for enhancing carbon dioxide capture capacity of a surface water body, comprising the following steps: (a) heating calcium sulfate dihydrate until solid calcium oxide is produced; (b) dissolving the calcium oxide in water to create a capture media; and (c) injecting the capture media in the surface water body to increase the pH of the water of the surface water body.

10. The method of claim 9, wherein prior to dissolving the calcium oxide in water, the calcium oxide is cooled to ambient temperature.

11. A method for removing ambient carbon dioxide from air utilizing the method for enhancing carbon dioxide capture capacity of the surface water body of claim 9.

* * * * *